(12) United States Patent
Jackson

(10) Patent No.: US 6,356,993 B1
(45) Date of Patent: Mar. 12, 2002

(54) DUAL ASPECT RATIO PE ARRAY WITH NO CONNECTION SWITCHING

(75) Inventor: James H. Jackson, Cary, NC (US)

(73) Assignee: Pyxsys Corporation, Sudbury, MA (US)

( * ) Notice: Subject to any disclaimer, the term of this patent is extended or adjusted under 35 U.S.C. 154(b) by 0 days.

(21) Appl. No.: 09/695,895

(22) Filed: Oct. 25, 2000

Related U.S. Application Data

(60) Provisional application No. 60/161,587, filed on Oct. 26, 1999.

(51) Int. Cl.[7] .............................................. G06F 15/80
(52) U.S. Cl. ........................................ 712/11; 712/22
(58) Field of Search ............................ 712/16, 17, 18, 712/19, 20, 22, 11

(56) References Cited

U.S. PATENT DOCUMENTS

| | | |
|---|---|---|
| 4,270,169 A | 5/1981 | Hunt et al. |
| 4,270,170 A | 5/1981 | Reddaway |
| 4,621,339 A | 11/1986 | Wagner et al. |
| 4,720,780 A | 1/1988 | Dolecek |
| 4,727,503 A | 2/1988 | McWhirter |
| 4,985,832 A | 1/1991 | Grondalski |
| 4,992,933 A | 2/1991 | Taylor |
| 5,038,386 A | 8/1991 | Li |
| 5,133,073 A | 7/1992 | Jackson et al. |
| 5,157,785 A | 10/1992 | Jackson et al. |
| 5,165,023 A | 11/1992 | Gifford |
| 5,179,714 A | 1/1993 | Graybill |
| 5,193,202 A | 3/1993 | Jackson et al. |
| 5,212,777 A | 5/1993 | Gove et al. |
| 5,239,654 A | 8/1993 | Ing-Simmons et al. |
| 5,253,308 A | 10/1993 | Johnson |
| 5,371,896 A | 12/1994 | Gove et al. |
| 5,410,727 A | 4/1995 | Jaffe et al. |
| 5,450,604 A | 9/1995 | Davies |
| 5,457,789 A | 10/1995 | Dietrich, Jr. et al. |
| 5,471,627 A | 11/1995 | Means et al. |
| 5,535,410 A | 7/1996 | Watanabe et al. |
| 5,577,262 A | 11/1996 | Pechanek et al. |
| 5,581,773 A | 12/1996 | Glover |

(List continued on next page.)

OTHER PUBLICATIONS

A Reconfigurable Processor Array with Routing LSIs and General Purpose DSPs; Jacob Levison, et al.; pp. 102–116; IEEE 1992.

A Single–Chip, 1.6 Billion, 16–b MAC/s Multiprocessor DSP; B. Ackland, et al.; pp. 412–424; IEEE Journal of Solid–State Circuits; vol. 35 No. 3; Mar. 2000.

A 450–MHz RISC Microprocessor with Enhanced Instruction Set and Copper Connect; Carmine Nicoletta; et al.; pp. 1478–1491; IEEE Journal of Sold–State Circuits; vol. 34 No. 11; Nov. 1999.

*Primary Examiner*—William M. Treat
(74) *Attorney, Agent, or Firm*—Weingarten, Schurgin, Gagnebin & Lebovici LLP

(57) ABSTRACT

A single-instruction multiple-data (SIMD) array processor for processing multi-dimensional node meshes that are either elongated or not elongated in at least one coordinate direction. The SIMD array processor includes a plurality of processor arrays interconnected to form an N-dimensional array. Each processor array in the N-dimensional array is connected to 2N data I/O paths for communicating with 2N processor arrays in the N-dimensional array. Each processor array conceptually located at an interior point of the N-dimensional array is connected to 2N dimensionally adjacent processor arrays in the N-dimensional array. Each processor array conceptually located at one of at least one pair of dimensionally opposite boundaries of the N-dimensional array is connected to fewer than 2N dimensionally adjacent processor arrays and at least one processor array conceptually located at the dimensionally opposing boundary.

10 Claims, 4 Drawing Sheets

U.S. PATENT DOCUMENTS

| | | |
|---|---|---|
| 5,588,152 A | 12/1996 | Dapp et al. |
| 5,590,356 A | 12/1996 | Gilbert |
| 5,630,162 A | 5/1997 | Wilkinson et al. |
| 5,673,396 A | 9/1997 | Smolansky et al. |
| 5,717,943 A | 2/1998 | Barker et al. |
| 5,752,068 A | 5/1998 | Gilbert |
| 5,809,292 A | 9/1998 | Wilkenson et al. |
| 5,822,608 A | 10/1998 | Dieffenderfer et al. |
| 5,842,031 A | 11/1998 | Barker et al. |
| 5,892,962 A | 4/1999 | Cloutier |
| 5,963,746 A | 10/1999 | Barker et al. |
| 6,038,580 A | 3/2000 | Yeh |
| 6,085,304 A | 7/2000 | Morris et al. |

DUAL ASPECT RATIO PE ARRAY WITH NO CONNECTION SWITCHING

CROSS REFERENCE TO RELATED APPLICATIONS

This application claims priority of U.S. Provisional Patent Application No. 60/161,587 filed Oct. 26, 1999 entitled FINITE DIFFERENCE ACCELERATOR.

STATEMENT REGARDING FEDERALLY SPONSORED RESEARCH OR DEVELOPMENT

N/A

BACKGROUND OF THE INVENTION

The present invention relates generally to SIMD array processors, and more particularly to SIMD array processors that can efficiently process multi-dimensional node meshes that are elongated in at least one coordinate direction.

Single-Instruction Multiple-Data (SIMD) array processors are known which comprise multi-dimensional arrays of interconnected Processing Elements (PE's) executing the same instruction simultaneously on a plurality of different data samples. For example, a conventional SIMD array processor may include a two-dimensional "North, East, West, and South (NEWS) array" of PE's. The PE's of the NEWS array may be implemented on an Application Specific Integrated Circuit (ASIC) to simplify data I/O connections with dimensionally adjacent ("neighboring") PE's in the array. Further, the PE's that are conceptually located along respective "edges" of the two-dimensional NEWS array comprise suitable North, East, West, and South data I/O paths for connecting these PE's with PE's that are physically located on either the same ASIC or a different ASIC.

Such conventional SIMD array processors can be used to solve a set of partial differential equations with associated boundary conditions that describe the nature of a physical environment over a finite volume of space. For example, a particular set of partial differential equations and boundary conditions may be approximated by a corresponding set of finite difference equations that describe values of dependent variables at a finite number of points or "nodes" distributed within a problem space (commonly known as a "node mesh"). After assigning each processing element in the NEWS array to at least one node in the mesh, the SIMD array processor can be used to calculate the dependent variable values at the finite number of nodes.

One drawback of such SIMD array processors is that they are frequently inefficient at solving problems having elongated node geometry. For example, in problems involving models of electromagnetic wave propagation through long wave-guides or models of fluid flow through long conduits, the number of nodes in the mesh distributed along the transverse cross-sectional coordinate directions may be smaller than the number of PE's in each coordinate direction of the NEWS array. As a result, when a node mesh for such a problem is mapped onto the NEWS array, communication distances between PE's that perform processing for adjacent nodes may be long enough to significantly increase the time required to solve the problem. To avoid such long communication distances between PE's, the node mesh may be mapped onto a rectangular subset of the NEWS array. However, when only a subset of the NEWS array is used, respective PE's in the subset may be called upon to handle the processing for more nodes in the mesh. This can also significantly increase the time required to solve the problem.

It would therefore be desirable to have an SIMD array processor that can efficiently adapt itself to process multi-dimensional node meshes that are elongated in at least one coordinate direction. Such an SIMD array processor would efficiently process node meshes of varying geometry without switching data I/O connections between PE's in the array.

BRIEF SUMMARY OF THE INVENTION

In accordance with the present invention, an SIMD array processor is provided that can efficiently process multi-dimensional node meshes that are elongated in at least one coordinate direction. The SIMD array processor includes a plurality of small processor arrays interconnected to form a larger N-dimensional array. Each small processor array can access 2N data I/O paths which it can use to communicate with 2N other small processor arrays in the larger N-dimensional array. Each small processor array conceptually located at an interior point of the larger N-dimensional array can communicate with 2N dimensionally adjacent small processor arrays. Each processor array conceptually located at one (1) of at least one pair of dimensionally opposite boundaries of the larger N-dimensional array is communicably coupleable to fewer than 2N dimensionally adjacent small processor arrays and at least one small processor array conceptually located at the dimensionally opposing boundary.

Other features, functions, and aspects of the invention will be evident from the Detailed Description of the Invention that follows.

BRIEF DESCRIPTION OF THE SEVERAL VIEWS OF THE DRAWING

The invention will be more fully understood with reference to the following Detailed Description of the Invention in conjunction with the Drawings of which.

DETAILED DESCRIPTION OF THE INVENTION

The entire disclosure of U.S. Provisional Patent Application No. 60/161,587 filed Oct. 26, 1999 is incorporated herein by reference.

Figure 1:
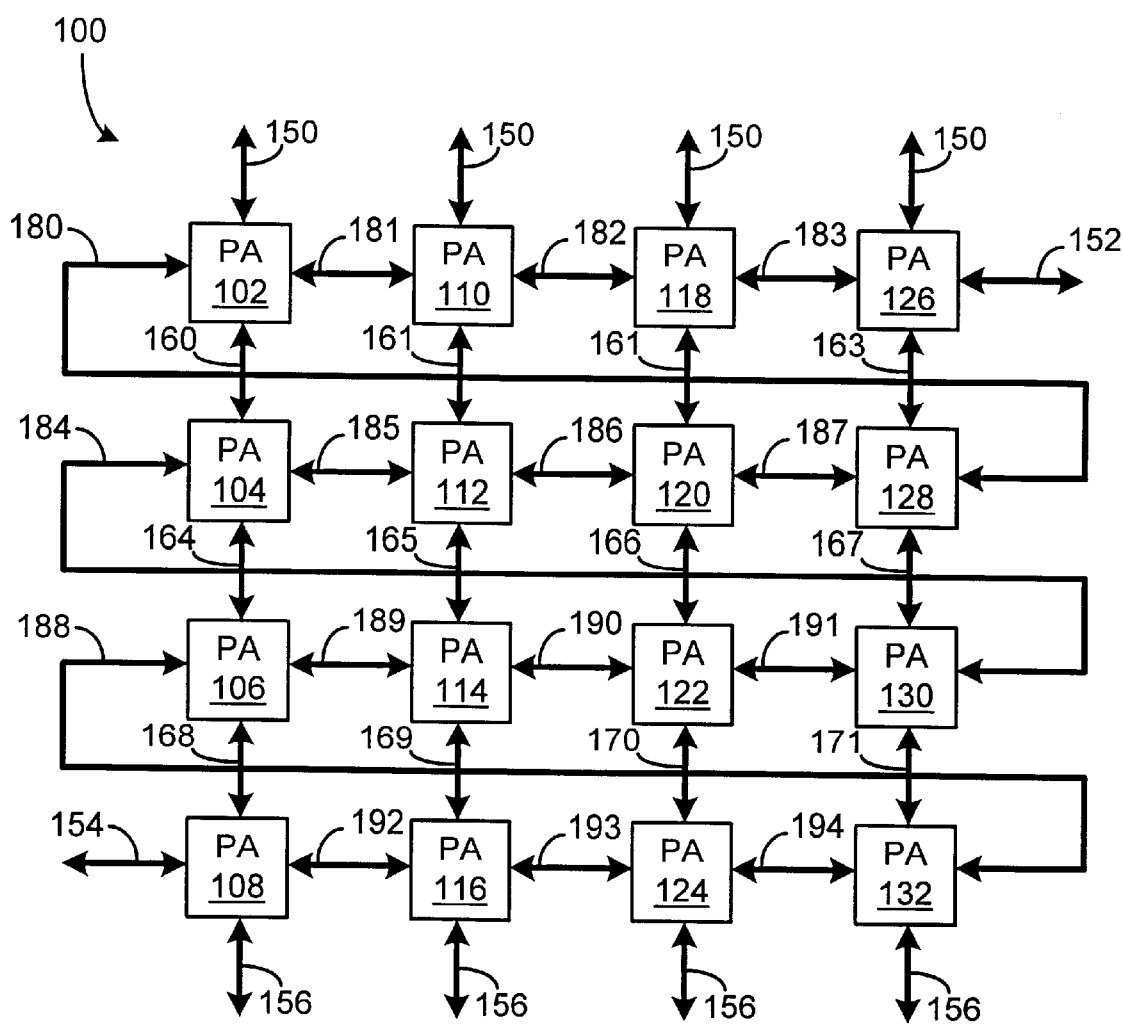
FIG. 1 is a block diagram of an SIMD array processor that is a two-dimensional NEWS array of small processor arrays in accordance with the present invention.

FIG. 1 is a block diagram depicting an illustrative embodiment of a Single-Instruction Multiple-Data (SIMD) array processor 100 in accordance with the present invention. In the illustrated embodiment, the SIMD array processor 100 includes a two-dimensional "North, East, West, and South (NEWS) array" of identical Processor Arrays (PA's) 102 through 132. In a preferred embodiment, each of the PA's 102 through 132 includes a Printed Circuit Board (PCB) electrically coupleable to a backplane of the SIMD array processor 100. Further, each PCB preferably has at least one Application Specific Integrated Circuit (ASIC) mounted thereto; and, the ASIC preferably includes a two-dimensional NEWS array of Processing Elements (PE's; see FIG. 2). Although FIG. 1 depicts the SIMD array processor 100 as including the two-dimensional NEWS array of PA's 102 through 132, it should be understood that the SIMD array processor 100 may alternatively comprise an array of PA's having two (2) or more dimensions. It should also be understood that the size of the array of PA's can be specified to suit the data processing requirements of the target application. FIG. 1 depicts the SIMD array processor 100 as including a 4×4 NEWS array of PA's for illustrative purposes.

As described above, the SIMD array processor 100 includes the NEWS array of identical PA's 102 through 132. For the PA 112 conceptually located at a respective interior point of the NEWS array, a North data I/O bus 161 interconnects the PA 112 and the dimensionally adjacent ("neighboring") PA 110, an East data I/O bus 186 interconnects the PA 112 and the neighboring PA 120, a West data I/O bus 185 interconnects the PA 112 and the neighboring PA 104, and a South data I/O bus 165 interconnects the PA 112 and the neighboring PA 114. The PA's 114, 120, and 122 that are conceptually located at respective interior points of the NEWS array are similarly connected to neighboring PA's in the array. Further, the PA's 110 and 118 that are conceptually located along the North edge of the NEWS array and the PA's 116 and 124 that are conceptually located along the South edge of the NEWS array comprise suitable North and South data I/O buses 150 and 156 for connecting these PA's with neighboring PA's physically located on respective PCB's.

For the PA 104 conceptually located along the West edge of the NEWS array, a North data I/O bus 160 interconnects the PA 104 and the neighboring PA 102; the East data I/O bus 185 interconnects the PA 104 and the neighboring PA 112; a South data I/O bus 164 interconnects the PA 104 and the neighboring PA 106; and, a West data I/O bus 184 interconnects the PA 104 and the PA 130, which is conceptually located along the dimensionally opposite (East) edge of the NEWS array. In the illustrated embodiment, the East edge of the NEWS array (comprising the PA's 126, 128, 130, and 132) is dimensionally opposite the West edge (comprising the PA's 102, 104, 106, and 108), and the North edge of the NEWS array (comprising the PA's 102, 110, 118, and 126) is dimensionally opposite the South edge (comprising the PA's 108, 116, 124, and 132). The PA 106 conceptually located along the West edge of the NEWS array is similarly connected by way of a West data I/O bus 188 to the PA 132, which is conceptually located at the intersection of the East and South edges of the NEWS array. The PA 102 conceptually located at the intersection of the West and North edges of the NEWS array is similarly connected by way of a West data I/O bus 180 to the PA 128, which is conceptually located along the East edge of the NEWS array. The PA's 102, 108, 126, and 132 comprise suitable North and South data I/O buses 150 and 156 for connecting these PA's with neighboring PA's physically located on respective PCB's. Further, the PA 108 conceptually located at the intersection of the West and South edges of the NEWS array comprises a suitable West data I/O bus 154 and the PA 126 conceptually located at the intersection of the East and North edges of the NEWS array comprises a suitable East data I/O bus 152 for connecting these PA's with PA's conceptually located along dimensionally opposite edges of respective NEWS arrays of PA's.

Figure 2:
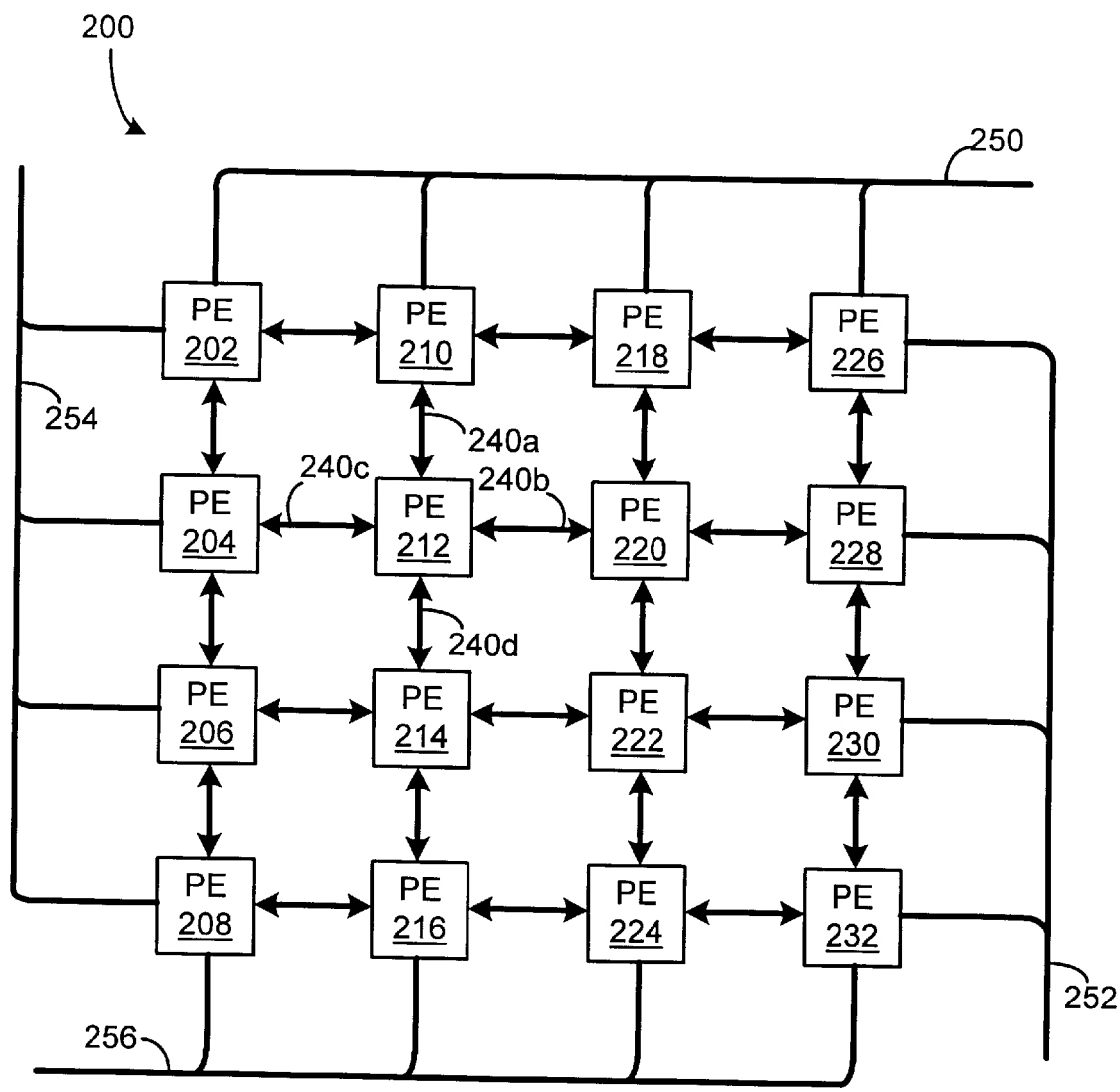
FIG. 2 is a block diagram of a small processor array included in the SIMD array processor of FIG. 1.

FIG. 2 depicts a block diagram of a PA 200 included in the SIMD array processor 100 (see FIG. 1). In a preferred embodiment, the PA 200 is representative of each of the PA's 102 through 132 included in the SIMD array processor 100 (see FIG. 1). Accordingly, the SIMD array processor 100 preferably includes a plurality of identical PA's such as the representative PA 200 interconnected in the NEWS array configuration.

In the illustrated embodiment, the PA 200 includes a two-dimensional NEWS array of PE's 202 through 232, which is preferably implemented on an ASIC to simplify data I/O connections with neighboring PE's in the array. It is understood that the size of the NEWS array of PE's can be specified to suit the data processing requirements of the target application. Further, although FIG. 2 depicts the PA 200 as including the PE's 202 through 232 interconnected in the NEWS array configuration, it should be understood that the PA 200 may alternatively include an array of PE's having one (1) or more dimensions. FIG. 1 depicts the PA 200 as including a 4×4 NEWS array of PE's for purposes of illustration.

For the PE 212, a North data I/O bus 240a interconnects the PE 212 and the neighboring PE 210, an East data I/O bus 240b interconnects the PE 212 and the neighboring PE 220, a West data I/O bus 240c interconnects the PE 212 and the neighboring PE 204, and a South data I/O bus 240d interconnects the PE 212 and the neighboring PE 214. Further, the PE's 202, 210, 218, and 226 conceptually located along the North edge of the NEWS array comprise respective data I/O buses that are provided to a North data I/O bus 250; the PE's 226, 228, 230, and 232 conceptually located along the East edge of the NEWS array comprise respective data I/O buses that are provided to an East data I/O bus 252; the PE's 202, 204, 206, and 208 conceptually located along the West edge of the NEWS array comprise respective data I/O buses that are provided to a West data I/O bus 254; and, the PE's 208, 216, 224, and 232 conceptually located along the South edge of the NEWS array comprise respective data I/O buses that are provided to a South data I/O bus 256.

Each of the PE's 202 through 232 of the NEWS array preferably reads four (4) bits of data directly (in parallel) from the PE connected to its North, East, West, or South data I/O bus while writing four (4) bits of data in parallel to the PE connected to a dimensionally opposite data I/O bus. For example, the PE 212 conceptually located at a respective interior point of the NEWS array may read four (4) bits of data in parallel from the PE 210 by way of the North data I/O 240a while writing four (4) bits of data in parallel to the PE 214 by way of the dimensionally opposite (South) data I/O bus 240d; and, the PE 212 may read four (4) bits of data in parallel from the PE 214 using the South data I/O bus 240d while writing four (4) bits of data in parallel to the PE 210 via the dimensionally opposite (North) data I/O 240a. Similarly, the PE 212 may read four (4) bits of data in parallel from the PE 204 by way of the West data I/O 240c while writing four (4) bits of data in parallel to the PE 220 by way of the dimensionally opposite (East) data I/O 240b; and, the PE 212 may read four (4) bits of data in parallel from the PE 220 by way of the East data I/O 240b while writing four (4) bits of data in parallel to the PE 204 by way of the dimensionally opposite (West) data I/O 240c. It is noted that each of the PE's 202, 204, 206, 208, 210, 216, 218, 224, 226, 228, 230, and 232 conceptually located along the edges of the PA 200 reads (writes) four (4) bits of data in parallel from (to) its neighboring PE's in the NEWS array while writing (reading) four (4) bits of data in parallel to (from) respective PE's included in different PA's by way of the data I/O buses 250, 252, 254, and 256. For example, the PE 204 may read (write) four (4) bits of data in parallel from (to) the neighboring PE 212 by way of the data I/O bus 240c while writing (reading) four (4) bits of data in parallel to (from) a PE included in a different PA by way of the data I/O bus 254.

Those of ordinary skill in this art will appreciate that SIMD array processors can be used to calculate dependent variable values at a finite number of points or "nodes" distributed within a multi-dimensional problem space (commonly known as a "node mesh"). It is noted that if the number of PE's in an array is less than or equal to the product of the number of nodes in two (2) coordinate directions of a three-dimensional node mesh, then the number of PE's in the remaining coordinate direction may be one (1) with no loss of functionality. For example, if the node mesh has dimensions (I×J×K) and the number of PE's in the array is less than or equal to IJ, then the array of PE's may have dimensions (P×Q×1). Such an array of PE's may be implemented as a two-dimensional NEWS array in which each PE can communicate with up to four (4) neighboring PE's in the array. It is understood that any communication between neighboring nodes in the coordinate direction of the NEWS array that has no data I/O path involves the manipulation of data within respective private memories (e.g., a Random Access Memory (RAM)) of the PE's rather than actual communication between physical PE's in the array.

It is further noted that such multi-dimensional node meshes may have elongated node geometry. In the illustrated embodiment, the SIMD array processor 100 (see FIG. 1) efficiently processes multi-dimensional node meshes that are either elongated or not elongated in at least one coordinate direction by either ignoring or accessing data on the data I/O paths between the PA's to conceptually form either a "rectangular" or "square" array of PE's.

For example, the SIMD array processor 100 may process a node mesh that is elongated in one (1) coordinate direction by ignoring data on the data I/O buses 150, 152, 154, 156, and 160 through 171 and accessing data on the remaining data I/O buses 180 through 194 to conceptually form a rectangular array of PE's having an aspect ratio of 16:1. Further, the SIMD array processor 100 may process a node mesh that is not elongated in any coordinate direction by ignoring data on the data I/O buses 150, 152, 154, 156, 180, 184, and 188 and accessing data on the remaining data I/O buses 160 through 171, 181 through 183, 185 through 187, 189 through 191, and 192 through 194 to conceptually form a square array of PE's having an aspect ratio of 1:1. Because rectangular and square arrays of PE's are conceptually formed by either ignoring or accessing data on the data I/O paths interconnecting the PA's 102 through 132, all of the data I/O connections between the PA's 102 through 132 are preferably always enabled. This means that no switching of the data I/O connections between enabled and disabled states is required to implement either the rectangular or square array of PE's.

As mentioned above, the SIMD array processor 100 may comprise an array of PA's having two (2) or more dimensions. In an exemplary array of PA's having three (3) dimensions, each PA in the three-dimensional array may be connected to six (6) data I/O paths for communicating with six (6) PA's in the array. Specifically, each PA conceptually located at an interior point of the three-dimensional array may be connected to six (6) neighboring PA's in the array; and, each PA conceptually located on a respective "face" of the three-dimensional array may be connected to a PA conceptually located on a face that is dimensionally opposite the respective face. Such an SIMD array processor may efficiently process multi-dimensional node meshes that are either elongated or not elongated in at least one coordinate direction by either ignoring or accessing data on the data I/O paths between the PA's to conceptually form, e.g., a two-dimensional rectangular array of PE's or a three-dimensional cubic array of PE's. In general, an N-dimensional array of PA's that can process node meshes that are elongated or not elongated in at least one coordinate direction can be formed by connecting each PA conceptually located at an interior point of the array to 2N neighboring PA's and connecting each PA conceptually located at one (1) of at least one pair of dimensionally opposite boundaries of the array to less than 2N neighboring PA's and at least one PA conceptually located at the dimensionally opposing boundary. In the illustrated embodiment, such boundaries comprise the North, East, West, and South edges of the NEWS array of PA's. In the above-mentioned exemplary three-dimensional array, such boundaries comprise the six (6) faces of the array of PA's.

Those of ordinary skill in this art will appreciate that the SIMD array processor 100 of FIG. 1 may be incorporated in a multi-dimensional processing system including, e.g., a command preprocessor interfaced with a processor controller that provides intermediary processing functions between the command preprocessor and the SIMD array processor 100.

Figure 3:
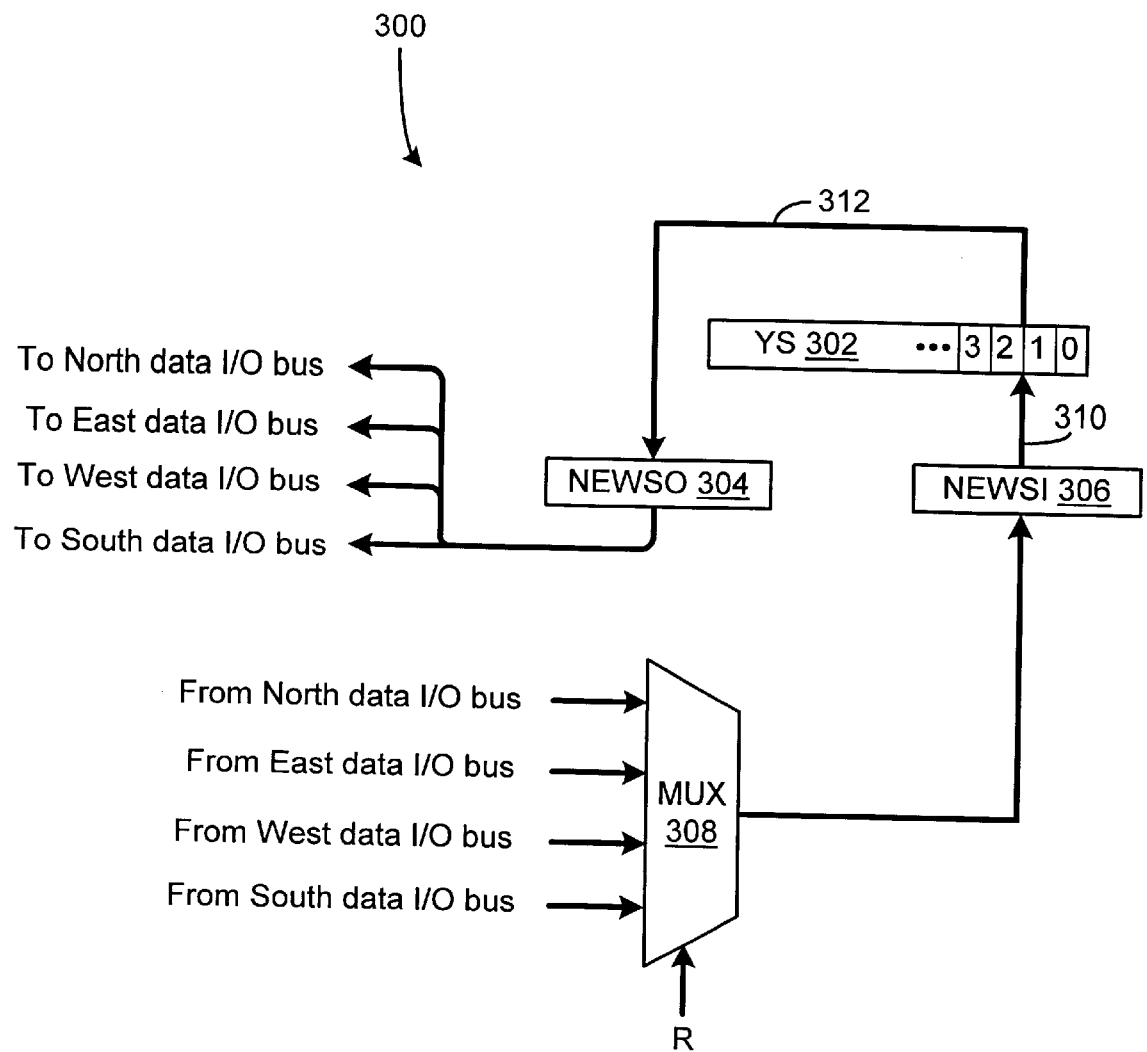
FIG. 3 is a block diagram of a portion of a processing element included in the processor array of FIG. 2.

FIG. 3 is a block diagram depicting an illustrative embodiment of a PE 300 in accordance with the present invention. In a preferred embodiment, the PE 300 is representative of each of the PE's 202 through 232 included in the PA 200 (see FIG. 2). Accordingly, the PA 200 preferably includes a plurality of identical PE's such as the representative PE 300 interconnected in the NEWS array configuration.

In the illustrated embodiment, the PE 300 includes a multi-bit data register YS 302. In a preferred embodiment, the data register YS 302 is 64-bits wide. It should be appreciated that the data register YS 302 can be used to store, e.g., a floating-point number or a signed/unsigned fixed-point integer. It should also be appreciated that the data register YS 302 can be used as a shift register. For example, the data register YS 302 may be used to shift left binary values contained therein.

As described above, each of the PE's 202 through 232 (see FIG. 2) of the NEWS array reads four (4) bits of data in parallel from the PE connected to its North, East, West, or South data I/O bus while writing four (4) bits of data in parallel to the PE connected to a dimensionally opposite data I/O bus. In the illustrated embodiment, the PE 300 includes communication registers NEWS Input (NEWSI) 306 and NEWS Output (NEWSO) 304. In a preferred embodiment, each of the communication registers NEWSI 306 and NEWSO 304 is 4-bits wide for reading and writing, respectively, four (4) bits of data in parallel from (to) a PE connected to its North, East, West, or South data I/O bus. Specifically, the communication register NEWSI 306 receives four (4) data bits in parallel from one of the North, East, West, and South data I/O buses and preferably loads the four (4) data bits in parallel into the four (4) Least Significant Bit (LSB) positions (i.e., bit positions 0, 1, 2, and 3) of the data register YS 302 by way of a bus 310. Further, the data register YS 302 preferably loads four (4) data bits in parallel into the communication register NEWSO 304 by way of a bus 312 from its four (4) LSB positions for subsequent provision in parallel to a respective communication register NEWSI (not shown) of another PE by way of a dimensionally opposite data I/O bus. For example, the NEWSO 304 may provide the four (4) data bits to the 4-bit wide North data I/O bus, the 4-bit wide East data I/O bus, the 4-bit wide West data I/O bus, and the 4-bit wide South data I/O bus coupled to corresponding PE's.

The PE 300 further includes a multiplexor (MUX) 308 that selects between the 4-bit wide data I/O buses coupled to the respective communication registers NEWSO (not shown) of the PE's connected to the North, East, West, and South data I/O buses. Specifically, the MUX 308 selects between the 4-bit wide North data I/O bus, the 4-bit wide East data I/O bus, the 4-bit wide West data I/O bus, and the 4-bit wide South data I/O bus. The PE 300 also includes circuitry that enables the output of the communication register NEWSO 304 to drive only the bus that is connected to the nearest PE in the opposite direction from that which the MUX 308 selects.

It is noted that the SIMD array processor 100 (see FIG. 1) preferably includes a sequencer (not shown) for, e.g., decoding commands provided by a processor controller to obtain a stream of instructions and broadcasting the instruction stream to the PE's included in the NEWS array of PA's 102 through 132. Such a sequencer includes a control register for providing a 2-bit control word R that controls the selection of one of the above-mentioned North, East, West, and South data I/O buses by the MUX 308 (see FIG. 3).

In the illustrated embodiment, the two-dimensional NEWS array of PA's 102 through 132 (see FIG. 1) that can process node meshes that are elongated or not elongated in one coordinate direction is formed by connecting each PA conceptually located at an interior point of the array to four (4) neighboring PA's, and connecting each PA conceptually located along one (1) of a pair of dimensionally opposite edges of the array to fewer than four (4) neighboring PA's and one (1) PA conceptually located along the dimensionally opposing edge. It is noted that increased flexibility in conceptually re-configuring the two-dimensional NEWS array of PA's to efficiently process node meshes of varying geometry can be achieved by connecting PA's conceptually located at intersections of two (2) edges of the array to more than one PA conceptually located along dimensionally opposite edges. For example, the PA 102 conceptually located at the intersection of the West and North edges of the NEWS array may be connected to both the PA 128 conceptually located along the East edge and the PA 116 conceptually located along the South edge of the array. Data on the respective data I/O paths between the PA 102 and the PA's 104, 110, 116, and 128 may then be either ignored or accessed to efficiently process the node mesh. Similarly, increased flexibility in conceptually re-configuring arrays of PA's having three or more dimensions can be achieved by connecting PA's conceptually located at intersections of boundaries, e.g., faces, of the array to more than one PA conceptually located at dimensionally opposite boundaries. Further, although FIG. 1 depicts the PA's 102, 104, and 106 conceptually located along the West edge of the NEWS array connected to the respective PA's 128, 130, and 132 conceptually located along the dimensionally opposite East edge, it is understood that the PE's conceptually located along the North edge may be similarly connected to respective PE's conceptually located along the dimensionally opposite South edge of the array.

Figure 4:
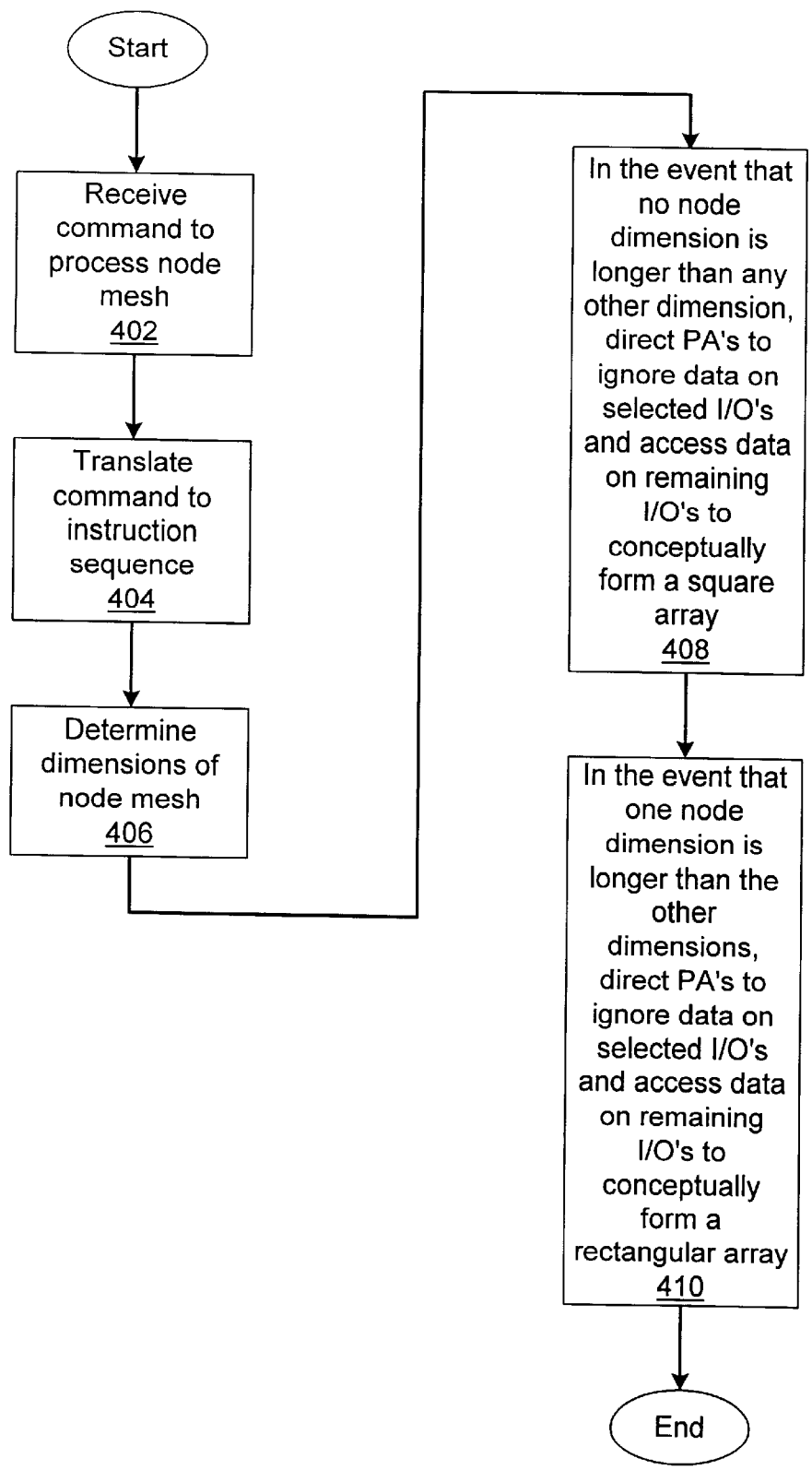
FIG. 4 is a flow diagram illustrating a method of processing a multi-dimensional node mesh that is elongated or not elongated in one coordinate direction using the SIMD array processor of FIG. 1.

A method of processing a multi-dimensional node mesh that is elongated or not elongated in one coordinate direction using the SIMD array processor 100 (see FIG. 1) is illustrated by reference to FIG. 4. In this illustrative method, a multi-dimensional node mesh defines locations of nodes in a problem space. Moreover, the SIMD array processor 100 determines the dimensions of the node mesh, and modifies the conceptual configuration of the NEWS array of PA's to obtain a NEWS array having an aspect ratio that conforms to the node mesh dimensions. For example, the SIMD array processor 100 may make such a determination of node mesh dimensions by reading information coded in an instruction sequence.

As depicted in step 402, a processor controller receives a command to process a multi-dimensional node mesh from a command preprocessor. Next, the processor controller translates, as depicted in step 404, the command to an instruction sequence for processing the multi-dimensional node mesh. The SIMD array processor 100 then determines, as depicted in step 406, the dimensions of the node mesh and modifies the conceptual configuration of the NEWS array to obtain a NEWS array having an aspect ratio that conforms to the node mesh dimensions. In the event that the SIMD array processor 100 determines that no node mesh dimension is longer than any of the other dimensions of the node mesh, the SIMD array processor 100 directs, as depicted in step 408, the PA's 102 through 132 to ignore any data provided on the data I/O buses 150, 152, 154, 156, 180, 184, and 188 and access data on the remaining data I/O buses 160 through 171, 181 through 183, 185 through 187, 189 through 191, and 192 through 194 to conceptually form a square array of PE's having an aspect ratio of 1:1. In the event that the SIMD array processor 100 determines that one node mesh dimension is longer than the other dimensions of the node mesh, the SIMD array processor 100 directs, as depicted in step 410, the PA's 102 through 132 to ignore any data provided on the data I/O buses 150, 152, 154, 156, and 160 through 171 and access data on the remaining data I/O buses 180 through 194 to conceptually form a rectangular array of PE's having an aspect ratio of 16:1.

Those of ordinary skill in the art should further appreciate that variations to and modification of the above-described SIMD array processor may be made without departing from the inventive concepts disclosed herein. Accordingly, the invention should not be viewed as limited except as by the scope and spirit of the appended claims.

What is claimed is:

1. A single-instruction multiple-data array processor, comprising:

a plurality of processor arrays; and a plurality of data paths for interconnecting the plurality of processor arrays in at least one row and at least one column to form an N-dimensional array, wherein each processor array located at a respective interior point of the N-dimensional array is connectable to 2N dimensionally adjacent processor arrays, and each first processor array located at a first boundary of at least one pair of dimensionally opposite boundaries of the N-dimensional array is connectable to (1) fewer than 2N dimensionally adjacent processor arrays and (2) at least one second processor array located at a second boundary of the at least one pair of dimensionally opposite boundaries, wherein the at least one second processor array is offset from a processor array at the second boundary corresponding to the first processor array by at least one row or column.

2. The single-instruction multiple-data array processor of claim 1 wherein each processor array located at a respective interior point of the N-dimensional array is configured to access at least one data sample from 2N dimensionally adjacent processor arrays.

3. The single-instruction multiple-data array processor of claim 1 wherein each processor array located at the first boundary of the at least one pair of dimensionally opposite boundaries is configured to access at least one data sample from a respective processor array located at the second boundary of the at least one pair of dimensionally opposite boundaries.

4. The single-instruction multiple-data array processor of claim 1 wherein each processor array includes an M-dimensional array of processing elements, each processing element including at least one data register, at least one first communication register, and at least one second communication register, the first communication register being configured to transfer data between the data register and the second communication register of at least one of the plurality of processing elements of the M-dimensional array.

5. The single-instruction multiple-data array processor of claim 4 wherein each processing element further includes a multiplexor coupled to the second communication register and configured to selectively provide data transferred from respective first communication registers of a portion of the plurality of processing elements of the M-dimensional array.

6. The single-instruction multiple-data array processor of claim 1 wherein the plurality of data paths interconnects the plurality of processor arrays to form a two-dimensional NEWS array.

7. A method of operating a computing system to solve a set of equations describing values of variables at a plurality of points in a node mesh, the computing system including an array processor having a plurality of processor arrays and a plurality of data paths for interconnecting the plurality of processor arrays in at least one row and at least one column to form an N-dimensional array, the method comprising the steps of:

providing at least one first processor array located at a respective interior point of the N-dimensional array, the first processor array being connected to 2N dimensionally adjacent processor arrays;

providing at least one second processor array located at a first boundary of at least one pair of dimensionally opposite boundaries of the N-dimensional array, the second processor array being connected to (1) fewer than 2N dimensionally adjacent processor arrays and (2) at least one third processor array located at a second boundary of the at least one pair of dimensionally opposite boundaries, the at least one third processor array being offset from a processor array at the second boundary corresponding to the second processor array by at least one row or column;

receiving an instruction sequence at an interface of the computing system, the instruction sequence including data to be provided to the N-dimensional array for solving the set of equations;

in the event it is determined by the computing system that no dimension of the node mesh is longer than any other dimension of the node mesh, selectively accessing data on the data paths interconnecting the processor arrays for conceptually forming a square array; and executing the instruction sequence by the square array.

8. The method of claim 7 further including the steps of:

in the event it is determined by the computing system that at least one dimension of the node mesh is longer than the other dimensions of the node mesh, selectively accessing data on the data paths interconnecting the processor arrays for conceptually forming a rectangular array; and executing the instruction sequence by the rectangular array.

9. The method of claim 7 wherein the selectively accessing step includes the step of ignoring data on the respective data paths interconnecting the processor arrays located at the first and second boundaries of the at least one pair of dimensionally opposite boundaries.

10. The method of claim 8 wherein the second selectively accessing step includes the step of ignoring data on a portion of the data paths interconnecting the dimensionally adjacent processor arrays, each data path of the portion of data paths being conceptually parallel to the first and second boundaries of the at least one pair of dimensionally opposite boundaries.

* * * * *